United States Patent [19]

Yokota et al.

[11] Patent Number: 4,510,425
[45] Date of Patent: Apr. 9, 1985

[54] CONTROL DEVICE FOR PUMP APPARATUS FOR VEHICULAR USE

[75] Inventors: Mitsuyoshi Yokota; Akio Matsumoto, both of Hyogo, Japan

[73] Assignee: Mitsubishi Denki Kabushiki Kaisha, Tokyo, Japan

[21] Appl. No.: 552,193

[22] Filed: Nov. 15, 1983

[30] Foreign Application Priority Data

Nov. 15, 1982 [JP] Japan .............. 57-173654[U]

[51] Int. Cl.³ .............................. G05B 13/00
[52] U.S. Cl. ..................... 318/484; 303/12; 307/144; 318/481
[58] Field of Search .......... 318/448, 481, 484, 138; 303/10, 11, 12, 97; 307/144

[56] References Cited

U.S. PATENT DOCUMENTS

| 3,880,472 | 4/1975 | Lewis et al. | 303/10 X |
|---|---|---|---|
| 4,030,005 | 6/1977 | Doemen | 318/138 |
| 4,094,555 | 6/1978 | Byrne et al. | 303/97 X |
| 4,121,140 | 10/1978 | Jones | 318/484 X |
| 4,218,730 | 8/1980 | Marumoto et al. | 318/345 B X |
| 4,220,900 | 9/1980 | Mintz | 318/469 X |
| 4,402,554 | 9/1983 | Belart | 303/10 |

FOREIGN PATENT DOCUMENTS

| 1195634 | 6/1965 | Fed. Rep. of Germany | 318/481 |
|---|---|---|---|
| 0016590 | 1/1982 | Japan | 318/448 |

Primary Examiner—S. J. Witkowski
Assistant Examiner—Bentsu Ro
Attorney, Agent, or Firm—Sughrue, Mion, Zinn, Macpeak & Seas

[57] ABSTRACT

A control device for a vacuum pump apparatus in which a hunting effect is substantially eliminated. A pressure-sensitive switch senses a negative pressure produced by a vacuum pump, the latter being driven by a d.c. motor. The switch has at least three contacts, the positions of which are changed at two different pressures. The output of the switch is compared with a fixed reference value, and the comparison result used to drive the d.c. motor. The d.c. motor is thus provided with hysteretic drive characteristic, thereby maintaining the vacuum pressure between the two predetermined values and eliminating the hunting effect.

6 Claims, 6 Drawing Figures

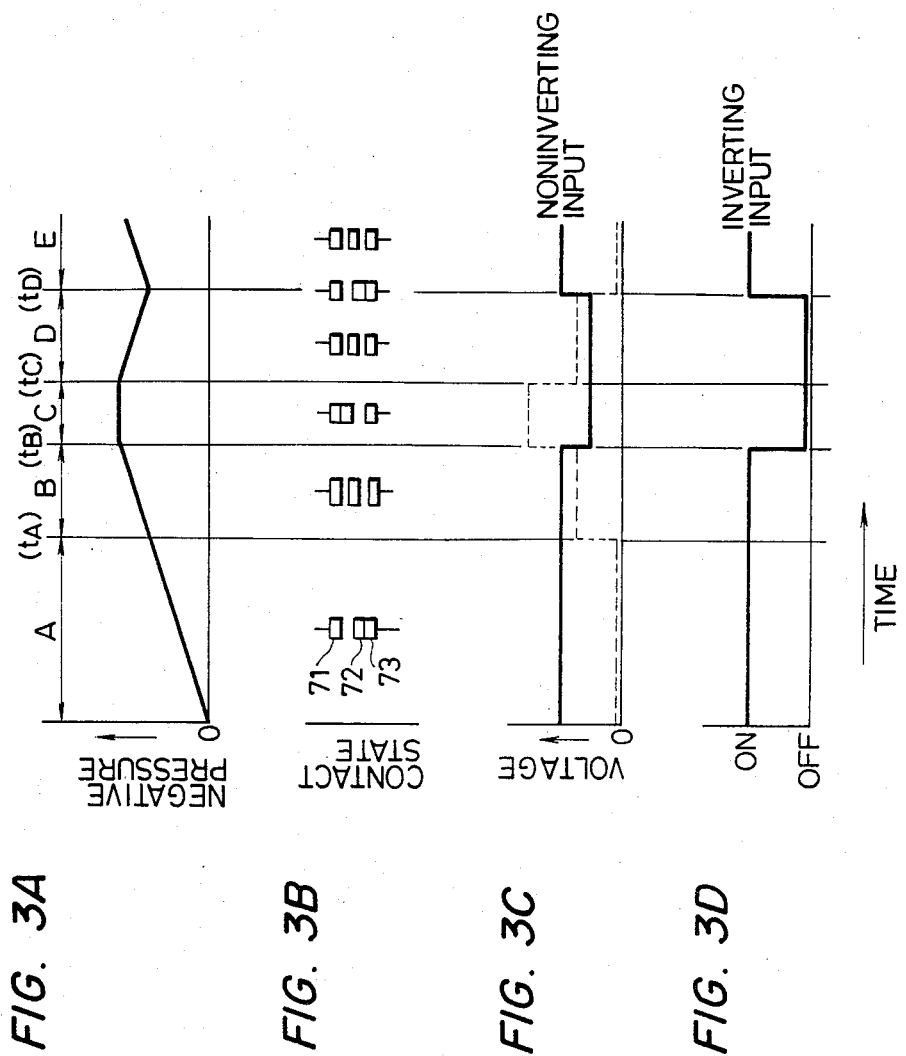

CONTROL DEVICE FOR PUMP APPARATUS FOR VEHICULAR USE

BACKGROUND OF THE INVENTION

The present invention relates to a control device for a pump apparatus for a vehicle, the pump apparatus being driven by a d.C. motor.

FIG. 1 shows an example of conventional control devices of this kind. In FIG. 1 the control device includes a vacuum pump 1 for supplying a negative pressure to a vacuum booster or a reservoir (not shown) of a brake system of a vehicle (not shown), a d.c. motor 2 for driving the vacuum pump 1, and a control circuit 3 for the d.c. motor 2. The control circuit 3 includes a power transistor 31 connected in series with the d.c. motor 2, a driver transistor 32 for controlling the power transistor 31, bias resistors 33 and 34 for the respective transistors 31 and 32, a diode 35 for absorbing surges, and a base-emitter resistor 36. The control device further includes a normally closed pressure switch 4 which is provided inside of the vacuum booster or reservoir for detecting the negative pressure generated by the vacuum pump 1. The switch 4 is opened when the negative pressure reaches a predetermined value. The control device further includes a battery 5 for supplying current to the control circuit 3 when a keyswitch 6 is closed.

With the conventional control device described above, prior to the time the engine (not shown) is started, the negative pressure in the vacuum booster or reservoir may be as low as atmospheric pressure, and the contacts of the pressure switch 4 will be in the closed state. When the keyswitch 6 is closed under this condition, current flows from the battery 5 through the bias resistor 33 to the base of the power transistor 31 since the driver transistor 32 is then in a nonconducting state. As a result, the power transistor 31 turns on, actuating the d.c. motor 2 to thereby drive the vacuum pump 1. Thereupon, the pressure in the vacuum booster or reservoir is decreased gradually. That is, a negative pressure is created.

Then, when the negative pressure reaches the predetermined value, the pressure switch 4 is opened, and hence current flows from the battery 5 through the keyswitch 6 and the bias resistor 34 of the drive transistor 32 to turn the latter on. Therefore, the power transistor 31 becomes nonconductive, causing the d.c. motor 2 and hence the vacuum pump 1 to be de-energized. Consequently, as the negative pressure in the vacuum booster or reservoir decreases, the contact of the pressure switch 4 is closed, again driving the d.c. motor 2. This operation is repeated to maintain the negative pressure in the vacuum booster or reservoir at the predetermined value.

In the above-described conventional control device, however, the on-off operation of the pressure switch contact is often so frequent that the so-called hunting phenomenon may be caused, which reduces the lifetime of the device.

SUMMARY OF THE INVENTION

This invention has been made to eliminate such defects in a conventional control device. The invention provides a control device for a vacuum pump for vehicular use which provides a hysterisis in the operating characteristics of the d.c. motor, which is intermittently driven in respone to the detected negative pressure in the vacuum booster or reservoir.

More specifically, the invention provides a control device for a vacuum pump for vehicular use including a d.c. motor, a vacuum pump which is driven by the d.c. motor for producing a negative pressure, and a pressure switch which detects the amount of negative pressure generated by the pump for controlling the d.c. motor in response to the detected pressure. In accordance with the invention, the pressure switch means includes at least three contacts so that the driving of the d.c. motor is provided with a hysteretic characteristic. A single pressure switch may be used for this purpose. Alternatively, two pressure switches, which are actuated by different pressures, may be employed.

BRIEF DESCRIPTION OF THE DRAWINGS

FIG. 3 is a timing chart showing operations at various portions of the circuit of FIG. 2.

DESCRIPTION OF THE PREFERRED EMBODIMENT

A preferred embodiment of the present invention will now be described with reference to the accompanying drawings.

Figure 1:
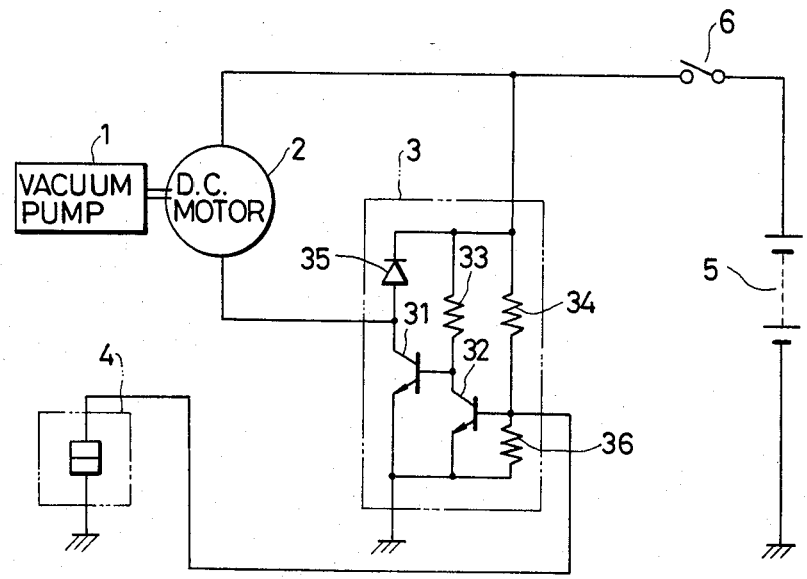
FIG. 1 is a circuit diagram of a conventional control device for a vacuum pump.
Figure 2:
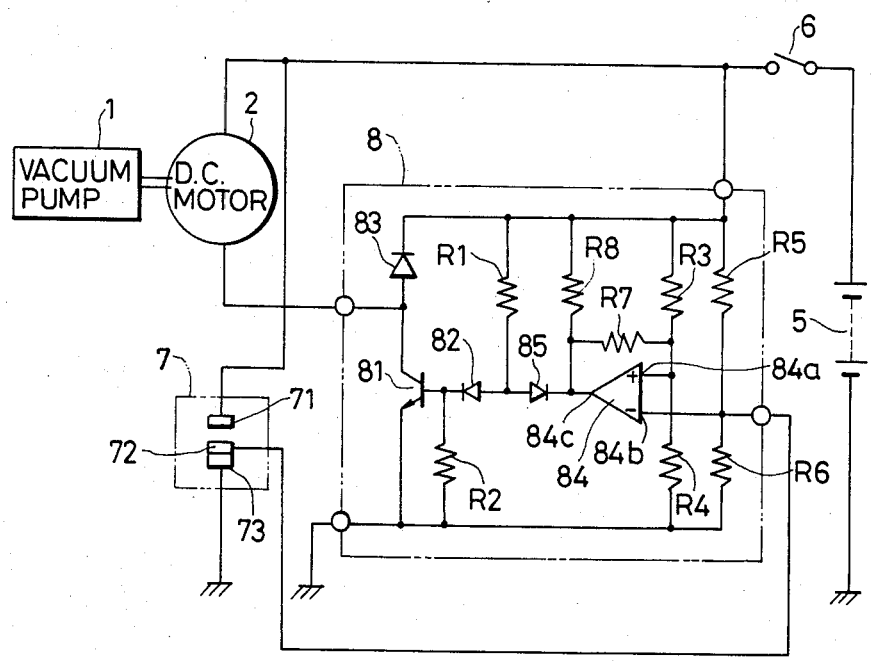
FIG. 2 is a circuit diagram of a preferred embodiment of a control device of the present invention.

FIG. 2 shows an embodiment of a pump control device according to the present invention. Reference numerals corresponding to those used in FIG. 1 are used to indicate the same or corresponding components in FIG. 2. The present control device includes a pressure switch 7 which includes a normally open, fixed contact 71, a movable contact 72 and a normally closed, fixed contact 73. The movable contact 72 is disconnected from the normally closed contact 73 at the time when the negative pressure reaches a first predetermined value and connected to the normally open contact 71 at the time when the negative pressure reaches a second predetermined value. The control device further includes a control circuit 8 composed of a power transisitor 81 having a bias resistor R1 and an emitter-base resistor R2, a diode 82, a surge-absorbing diode 83, a voltage comparator 84 having a noninverting input terminal 84a, an inverting input terminal 84b and an output terminal 84c, voltage dividing resistors R3 and R4 for providing a reference voltage, voltage dividing resistors R5 and R6 coupled to a comparing input, a feedback resistor R7, an output resistor R8, and a reverse current blocking diode 85. The resistor R5 is connected between the normally open contact 71 and the movable contact 72 of the pressure contact 7, and the resistor R6 is connected between the normally closed contact 72 and the movable contact 72.

The operation of the control device constructed as described above will be discussed with reference to FIG. 3, which is a timing chart showing signals at various points in the circuit of FIG. 2.

FIG. 3A shows the variations of negative pressure in vacuum booster versus time. FIG. 3B shows contact position of pressure sensitive switch. FIG. 3C shows input to comparator. FIG. 3D shows d.c. motor energization.

Initially, the negative pressure in the vacuum booster or reservoir is small, and hence the movable contact 72 and the normally closed contact 73 of the pressure switch 7 are in contact. When the keyswitch 6 is closed under these conditions, the inverting input terminal 84b of the voltage comparator 84 is grounded and the output terminal 84c goes to an "H" (high) level, so that current flows from the battery 5 through the keyswitch 6, the resistor R1 and the diode 82 to the base of the power transistor 81, turning on the latter and driving the d.c. motor 2 and hence the vacuum pump 1. Thereupon, the negative pressure in the vacuum booster or reservoir is increased gradually by the vacuum pump 1 during a time period A indicated in FIG. 3. When the negative pressure reaches a first predetermined value at a time t, the movable contact 72 is moved away from the normally closed contact 73. However, since values of the voltage dividing resistors R3, R4, R5 and R6 are selected such that the voltage across the resistor R6, which is applied to the inverting input 84b, is lower than that across the resistor R4, which is applied to the noninverting input 84a, the output terminal 84c of the comparator 84 is maintained at the "H" level, causing the power transistor 81 to be conductive continuously to thereby drive the d.c. motor 2 continuously in a period B indicated in FIG. 3.

When the negative pressure reaches the second predetermined value at a time t, the movable contact 72 is connected to the normally open contact 71, and therefore the voltage applied to the inverting input 84b becomes higher than that applied to the noninverting input 84a. Thus, the output of the comparator 84 at the output terminal 84c is changed to the "L" (low) level. Consequently, the base current of the power transistor 81 is cut off, turning the latter off, and thus de-energizing the d.c. motor 2. Further, with the output terminal 84c at the "L" level, the input voltage to the noninverting input 84a is lowered, due to the presence of the feedback resistor R7, during a period C shown in FIG. 3C. Since the vacuum pump 1 is de-energized when the d.c. motor 2 is de-energized, the negative pressure in the vacuum booster or reservoir is reduced due to consumption, so that the movable contact 72 becomes disconnected from the normally open contact 71 to thus apply the same voltage as that in the period B to the inverting input 84b. At this time, however, since the voltage at the noninverting input 84a is lowered, as mentioned, for the period C indicated in FIG. 3C, the output terminal 84c is maintained at the "L" level in a period D shown in FIG. 3, and thus the power transistor is maintained in the off state. The negative pressure is gradually reduced in this manner. At a time $t_D$ when the pressure reaches the first predetermined value, the inverting input 84b is grounded and the output terminal 84c goes to the "H" level again, as shown in FIG. 3C. Thus, the power transistor 81 turns on again and the d.c. motor 2 is actuated. As a result, the vacuum pump 1 is actuated again so that the negative pressure in the vacuum booster or reservoir tank increases.

The above-discussed operations are repeated to maintain the negative pressure in the vacuum booster or reservoir in a range between the first and second predetermined values.

It should be noted that although the above embodiment has been described with reference to the embodiment of a pressure switch having three contacts, the same affect can be obtained by using one pressure switch which opens at the first predetermined value and another pressure switch which closes at the second predetermined value.

As described hereinbefore, according to the present invention, by constituting the control device with a pressure switch having three contacts or two pressure switches having different operating values, the hunting phenomenon, which is inherent in the conventional control system, is eliminated.

We claim:

1. A control device for a vacuum pump apparatus for vehicular use, comprising: a d.c. motor; a pump coupled to be driven by said d.c. motor for producing a negative pressure; and pressure switch means for detecting a negative pressure generated by said pump and for controlling said d.c. motor in response to the detected pressure, said pressure switch means comprising three contacts for providing driving of said d.c. motor with a hysteretic characteristic.

2. The control device as claimed in claim 1, wherein said pressure switch means comprises two pressure switches, said pressure switches being actuated upon different pressures.

3. A control device for a vacuum pump apparatus for vehicular use, comprising; a d.c. motor; a pump coupled to be driven said d.c. motor for producing a negative pressure; a pressure-sensitive switch for detecting a negative pressure produced by said pump, said pressure-sensitive switch including at least three contacts, positions of said contacts being changed upon reaching first and second predetermined pressures; means for comparing an output of said pressure-sensitive switch with a reference value; and driver means for driving said d.c. motor with a hysteretic characteristic in response to an output of said comparing means.

4. The control device as claimed in claim 3, wherein said pressure-sensitive switch comprises two fixed contacts and a movable contact, said movable contact being normally engaged with a first of said normally closed contacts, moved away from said first of said normally closed contacts upon the presence of said first predetermined pressure, and said movable contact being moved into contact with a second of said fixed contacts upon reaching said second predetermined pressure.

5. The control device as claimed in claim 3, wherein said pressure switch comprises first and second pressure switch sections.

6. A control device for a vacuum pump apparatus for vehicular use, comprising: a d.c. motor; a pump coupled to be driven by said d.c. motor for producing a negative pressure; a pressure-sensitive switch disposed to sense the pressure produced by said vacuum pump, said switch having first and second fixed contacts and a movable contact, said movable contact being normally engaged with said first fixed contact, said movable contact being moved away from said first fixed contact upon reaching a first predetermined pressure, and said movable contact being moved into contact with said second fixed contact upon reaching a second predetermined pressure, said first fixed contact being coupled to a ground terminal and said second fixed contact being coupled to a power supply terminal; a comparator having a first comparison input terminal coupled to said movable contact; a first voltage divider for providing a reference voltage to a second comparison input terminal of said comparator; a second voltage divider for biasing said first comparison input terminal; a feedback resistor coupled between said second comparison input terminal and an output of said comparator; and a driver transistor having a base input coupled to said output of said comparator, an emitter coupled to ground, and a collector coupled to a first terminal of said d.c. motor, a second terminal of said d.c. motor being coupled to said power supply terminal.

* * * * *